United States Patent
Martinotti et al.

(10) Patent No.: US 9,559,974 B2
(45) Date of Patent: Jan. 31, 2017

(54) METHOD AND DEVICE FOR CREATING AND FOR RECEIVING A DATA PACKET WITH DISCARD ELIGIBLE INFORMATION

(76) Inventors: Riccardo Martinotti, Savona (IT); Raoul Fiorone, Genoa (IT); Francesco Fondelli, Calcinaia (IT)

(*) Notice: Subject to any disclaimer, the term of this patent is extended or adjusted under 35 U.S.C. 154(b) by 320 days.

(21) Appl. No.: 13/979,350

(22) PCT Filed: Apr. 18, 2011

(86) PCT No.: PCT/EP2011/056074
§ 371 (c)(1),
(2), (4) Date: Oct. 22, 2013

(87) PCT Pub. No.: WO2012/100842
PCT Pub. Date: Aug. 2, 2012

(65) Prior Publication Data
US 2014/0043976 A1    Feb. 13, 2014

(30) Foreign Application Priority Data
Jan. 27, 2011    (EP) ..................................... 11152395

(51) Int. Cl.
*H04L 1/00*      (2006.01)
*H04L 12/833*    (2013.01)
*H04L 12/801*    (2013.01)
*H04L 12/723*    (2013.01)

(52) U.S. Cl.
CPC ............... *H04L 47/31* (2013.01); *H04L 47/12* (2013.01); *H04L 45/50* (2013.01)

(58) Field of Classification Search
CPC ...................................................... H04L 47/10
USPC ........................................................ 370/235
See application file for complete search history.

(56) References Cited

U.S. PATENT DOCUMENTS

2005/0220143 A1* 10/2005 DelRegno et al. ........... 370/471
2006/0013226 A1*  1/2006 Ervin .................. H04L 12/4633
                                                                370/392
2009/0129289 A1   5/2009 Waggener et al.

FOREIGN PATENT DOCUMENTS

EP         1585265 A1    10/2005

OTHER PUBLICATIONS

"Cisco IOS Multiprotocol Label Switching Configuration Guide", 2008, Cisco Systems, Release 12.4T.*

(Continued)

*Primary Examiner* — Christopher R Crompton
(74) *Attorney, Agent, or Firm* — Nicholson De Vos Webster & Elliott LLP

(57) ABSTRACT

Aspects of the present disclosure relate to a method and a device for creating a data packet with discard eligible information and to a method and device for receiving a data packet with discard eligible information. Specifically, one aspect of the present disclosure provides a method for creating a data packet, containing a data payload and at least one label determining onward routing for the data packet, for onward transmission in a data communication system, a machine readable medium for implementing the method, and a corresponding device. In a first step a discard eligibility associated with the data packet is determined. In a second step, discard eligible information is encoded in a label determining onward routing for the data packet. In a third step an outgoing data packet including the label is generated.

12 Claims, 3 Drawing Sheets

(56) References Cited

OTHER PUBLICATIONS

"IEEE 802.1ad Support on Provider Bridges," Apr. 19, 2010, 14 pages, Cisco Systems, Inc.
"Implementing IEEE 802.1ah Provider Backbone Bridge," Sep. 2013, 62 pages, Cisco ASR 9000 Series Aggregation Services Router L2VPN and Ethernet Services Configuration Guide OL-28379-03.
Le Faucheur, F., et al., "Multi-Protocol Label Switching (MPLS) Support of Differentiated Services," May 2002, 53 pages, Network Working Group, Request for Comments: 3270, The Internet Society.
Niven-Jenkins, B., et al., "MPLS-TP Requirements draft-ietf-mpls-tp-requirements-10," Aug. 16, 2009, 32 pages, MPLS Working Group, Internet-Draft, IETF Trust and the persons identified as the document authors.
Rosen, E., et al., "MPLS Label Stack Encoding," Jan. 2001, 23 pages, Network Working Group, Request for Comments: 3032, The Internet Society.
Rosen, E., et al., "Multiprotocol Label Switching Architecture," Jan. 2001, 51 pages, Network Working Group, Request for Comments: 3031, The Internet Society.
International Search Report, Application No. PCT/EP2011/056074, dated Aug. 12, 2011, 2 pages.
Written Opinion for International Application No. PCT/EP2011/056074, mailed on Aug. 12, 2011, 7 pages.
International Preliminary Report on Patentability for Application No. PCT/EP2011/056074, mailed on Aug. 8, 2013, 9 pages.
Office Action for European Application No. 11716221.4, mailed on Aug. 13, 2014, 7 pages.
Office Action for European Application No. 11716221.4, mailed on Apr. 7, 2015, 7 pages.
Intention to Grant for European Application No. 11716221.4, mailed on Apr. 29, 2016, 37 pages.

* cited by examiner

METHOD AND DEVICE FOR CREATING AND FOR RECEIVING A DATA PACKET WITH DISCARD ELIGIBLE INFORMATION

CROSS-REFERENCE TO RELATED APPLICATIONS

This application is a National stage of International Application No. PCT/EP2011/056074, filed Apr. 18, 2011, which claims priority to EP Application No. 11152395.7, filed Jan. 27, 2011, which are both hereby incorporated by reference in their entirety.

TECHNICAL FIELD

The present invention relates to a method and a device for creating a data packet with discard eligible information and to a method and device for receiving a data packet with discard eligible information.

BACKGROUND

Embodiments of the invention may be implemented in any network in which labels are used for routing of data packets within a network. One example of such a network is a multi protocol label switching (MPLS) network.

As will be known by the skilled person, in a MPLS network the data payload to be carried by the MPLS network is provided with a header containing one or more labels. The labels define a label switched path (LSP) that determines the network node to which the data packet is to be forwarded as the data packet travels through the MPLS network.

At an edge node of the MPLS, therefore, one or more labels are added to the received data payload, and the resulting data packet is forwarded to an intermediate network node using the label switched path (LSP) defined by the label. At the intermediate node, the label is swapped or replaced with a label that is meaningful for the next label switched path (LSP) to the next MPLS network node. Each network node is provisioned with labels for the outgoing label switched paths from that network node. A sequence of label switched paths (LSP) form a Label Switched Path Tunnel (LSP tunnel), which defines a pathway between successive network nodes through the MPLS network along which successive packets can be sent.

Congestion within a data network can cause deterioration in the overall performance of the network. One way in which congestion may be managed is by determining on a packet by packet basis whether a data packet is eligible to be discarded, i.e. not forwarded onwards within the network. Typically discard eligibility may be determined for a packet as it enters the MPLS network at an edge node, based on the service agreement relating to the packet and network congestion information.

Typically discard eligible information (DEI) is included in the data packet at the MPLS edge node depending on the discard eligibility. Subsequently, when the data packet is received at a network node, the discard eligible information (DEI) can be used to determine the discard eligibility of the packet. If the data packet is discard eligible, a determination whether to discard the packet can be made depending on the local congestion information.

An exemplary form of discard eligibility is the service disposition defined in Metro Ethernet Forum (MEF) standard MEF10 as follows:

| Service disposition | Action at edge node | Action at intermediate node |
|---|---|---|
| Red | Discard | none necessary |
| Yellow | add DEI to packet | Deliver according to the Service Attributes of the service instance but service level (SLS) performance objectives do not apply. |
| Green | add DEI to packet | Deliver according to the Service Attributes of the service instance and service level (SLS) performance objectives apply. |

Data packets having different quality of service requirements may be carried on the same label switched path by defining different classes of service. In particular, a Label Switched Path (LSP) can be used to support one or more ordered aggregates. Such label switched paths can support up to eight behaviour aggregates of a given forward equivalency class regardless of how many ordered aggregates these behaviour aggregates span.

It is envisaged that in the future the demand for network capacity to handle data packets having differentiated classes of service, together with discard eligible information (DEI) will increase.

The present invention seeks to alleviate or ameliorate at least some of the disadvantages of the prior art, and to provide a novel method and a device for creating a data packet with discard eligible information and a novel method and device for receiving a data packet with discard eligible information.

SUMMARY

According to one aspect of the present invention there is provided a method for creating a data packet, containing a data payload and at least one label determining onward routing for the data packet, for onward transmission in a data communication system. In a first step a discard eligibility associated with the data packet is determined. In a second step, discard eligible information is encoded in a label determining onward routing for the data packet. In a third step an outgoing data packet including the label is generated.

According to a second aspect of the invention there is provided machine-readable medium comprising instructions which cause a processor to perform a method for creating a data packet, containing a data payload and at least one label determining onward routing for the data packet, for onward transmission in a data communication system. In first step of the method a discard eligibility associated with the data packet is determined. In a second step, discard eligible information is encoded in a label determining onward routing for the data packet. In a third step an outgoing data packet including the label is generated.

According to a third aspect of the invention there is provided a device for creating a data packet, containing a data payload and at least one label determining onward routing for the data packet, for onward transmission in a data communication system. The device comprises a discard eligibility determining function operable to determine discard eligibility associated with the data packet. The device also comprises a label encoding function for encoding discard eligible information in the label determining onward routing for the data packet. The device also comprises a data packet generating function for generating an outgoing data packet including the label.

According to a fourth aspect of the invention there is provided a method of receiving a data packet in a data communications system, the data packet comprising a data payload and a label controlling routing of the data packet in the communication system. In a first step the discard eligibility is determined from the label of the header. In a second step it is determined whether to transmit the data payload onwards using the discard eligibility and network congestion information.

According to a fifth aspect of the invention there is provided machine-readable medium comprising instructions which cause a processor to perform a method of receiving a data packet in a data communications system, the data packet comprising a data payload and a label controlling routing of the data packet in the communication system. In a first step of the method the discard eligibility is determined from the label of the header. In a second step it is determined whether to transmit the data payload onwards using the discard eligibility and network congestion information.

In accordance with a sixth aspect of the invention there is provided a device for receiving a data packet containing a data payload and at least one label controlling routing of the data packet in the communication system. The device comprises a network congestion information store storing network congestion information. The device also comprises a discard eligibility determining function operable to determine discard eligibility associated with the received data packet from the label controlling routing of the data packet in the communication system. The device also comprises a discard determining function, coupled to the discard eligibility determining function to receive the discard eligibility, and coupled to congestion information store to receive network congestion information, and operable to determine whether to transmit the data payload onwards depending on the discard eligibility and the network congestion information.

BRIEF DESCRIPTION OF THE DRAWINGS

The invention will now be described by way of example with reference to the accompanying drawings.

DETAILED DESCRIPTION

An embodiment of the invention will now be described with reference to the accompanying drawings. Embodiments of the invention may be implemented in networks in which labels are used in routing of data packets within a network. One example of such a network is a MPLS network, and the exemplary embodiment relates to a MPLS network.

Figure 1:
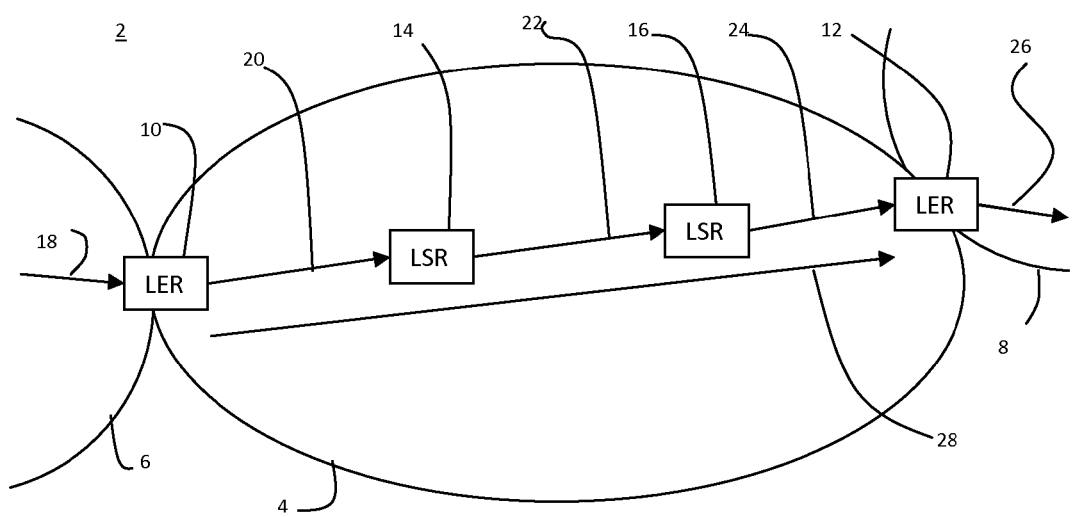
FIG. 1 is a schematic drawing of a network arrangement 2 illustrating the transfer of packets across an MPLS network.

FIG. 1 is a schematic drawing of a network arrangement 2 illustrating the transfer of packets across an MPLS network 4.

In FIG. 1 the network arrangement 2 comprising a MPLS network 4, a first data network 6 and a second data network 8 is shown. The first and second data networks 6, 8 might be any kind of data network capable of transporting data.

The MPLS network 4 has MPLS edge nodes to manage the interface between the MPLS network 4 and other data networks 6, 8. The MPLS network 4 has a Label Edge Router 10 (also called a Provider Edge node) to manage the interface between the first data network 6 and the MPLS network 4, and a Label Edge Router 12 (also called a Provider Edge node) to manage the interface between the second data network 8 and the MPLS network 4.

The MPLS network 4 has a number of intermediate nodes that perform a switching function for data packets travelling through the MPLS network 4. In the MPLS network 4, exemplary Label Switched Router 14 (also called a P-Router) and Label Switched Router (LSR) 16 (also called P-Router) are shown.

In FIG. 1 incoming data 18 is received from first data network 6 and the Label Edge Router 10 and formats and applies a label to the data payload of the incoming data to form labelled data 20 for onward transmission in the MPLS network 4. The reformatted labelled data 20 is sent on a first hop from Label Edge Router 10 to Label Switched Router (LSR) 14 as determined by the label applied by the Label Edge Router 10.

The Label Switched Router (LSR) 14 swaps the labels applied to the data by the Label Edge Router 10 for a new label. The labelled data 22 is sent on a second hop from Label Switched Router (LSR) 14 to Label Switched Router (LSR) 16 as determined by the label applied by the Label Switched Router (LSR) 14.

The Label Switched Router (LSR) 16 swaps the labels applied to the data by the Label Switched Router (LSR) 14 for a new label. The labelled data 24 is sent on a third hop from Label Switched Router (LSR) 16 to Label Edge Router (LER) 12 as determined by the label applied by the Label Switched Router (LSR) 16. The Label Edge Router (LER) 12 strips the label from the data payload and formats the data payload as outgoing data 26 for onward transmission in the second data network 8.

The path through the MPLS network 4 from Label Edge Router 10 to Label Switched Router (LSR) 14 to Label Switched Router (LSR) 16 to Label Edge Router (LER) 12 forms a Label Switched Path Tunnel (LSP tunnel) 28.

Figure 2:
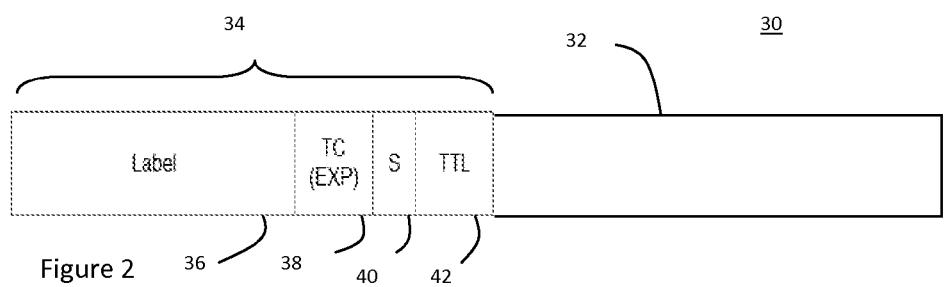
FIG. 2 shows the format of a standard MPLS data packet.

The format of a standard MPLS data packet 30 will now be explained in more detail with reference to FIG. 2.

The standard MPLS data packet 30 is formed from a data payload 32 and the MPLS header 34. The MPLS header 34 is formed of the following parts:

a label field 36, typically 20 bits long, containing a label value for use in determining switching of the data packet 30 through the MPLS network 4;

a TC(EXP) field 38, typically 3 bits long, containing class of service (CoS) information and sometimes containing discard eligible information (DEI) relating to the data packet 30;

a bottom of stack field S 40, typically 1 bit long, indicating the bottom of the label stack, if more than one label is present; and a time-to-live (TTL) field 42, typically 8 bits, containing a time-to-live parameter for the data packet 30.

In standard MPLS data packets 30, class of service (CoS) information (PSC) is encoded in the TC(EXP) field 38. In some implementations, discard eligible information (DEI) for the MPLS data packet may also be encoded in the TC(EXP) field 38.

In accordance with embodiments of the present invention, the MPLS header is modified so that the label field carries discard eligible information associated with the data packet. The modified MPLS header 44 in accordance with some embodiments will now be described with reference to FIG. 3. Fields in the header 44 that are the same as the fields in the MPLS header 34 have been given the same reference numerals.

The MPLS header 44 in accordance with some embodiments is formed of the following parts:
- a label field 46, typically 20 bits, including discard eligible information (DEI) 48, containing a label value for use in determining switching of the data packet through the MPLS network 4;
- a TC(EXP) field 50, typically 3 bits, in some embodiments containing class of service (CoS) information relating to the data packet;
- a bottom of stack field S 40, typically 1 bit, indicating the bottom of the label stack, if more than one label is present; and
- a time-to-live (TTL) field 42, typically 8 bits, containing the time-to-live parameter for the data packet 30.

The functions of the header fields, and the number of bits allocated to each header field, in the exemplary embodiment indicated above are consistent with the MPLS data network. However embodiments may be used in data networks in which the functions of the header fields and/or the number of bits allocated to each header field differ from the exemplary embodiment shown in FIG. 3.

Figure 3:
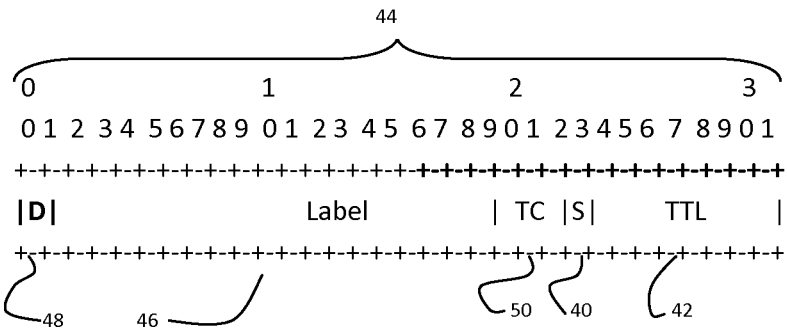
FIG. 3 shows a modified MPLS header in accordance with embodiments of the invention.

In embodiments of the invention it can be seen that the label field 46 includes discard eligible information (DEI) 48 for the data packet in addition to containing the label value for use in determining switching of the data packet through a MPLS network 4. Since the discard eligible information (DEI) 48 is included within the label, all bits of the TC(EXP) field 50 may be used for class of service (CoS) information. In the exemplary embodiment with a header as shown in FIG. 3, up to 8 separate classes of service, as defined by the three bits of the TC(EXP) field 50, can be applied to the label switched path (LSP) defined by the label 46, and discard eligible information (DEI) 48 is available for each data packet, thus giving rise to 16 available combinations of class of service (CoS) and discard eligible information (DEI) 48.

An exemplary method 54 for creating a data packet in accordance with some embodiments will now be described with reference to FIG. 4.

In a first step 56, discard eligibility associated with the data packet is determined.

In some embodiments, for example when the method is implemented in a Label Edge Router (LER) such as Label Edge Router (LER) 10, service agreement information and service congestion information relating to the transfer of the data packet over the data communication network may be used to determine discard eligibility of the data packet. In some embodiments, for example when the method is implemented in a Label Switched Router (LER) such as Label Edge Router (LER) 14, discard eligibility associated with the data packet may be determined from discard eligible information (DEI) encoded within the label of the header of a received data packet.

In a second step 58, discard eligible information (DEI) is encoded in a label determining onward routing for the data packet.

Encoding of the discard eligible information (DEI) in the label may depend on the discard eligibility associated with the data packet. In some embodiments, encoding of the discard eligible information (DEI) in the label is performed by selecting a label from a set of available labels determining the correct onwards routing of the data packet. In some embodiments the set of available labels determining the onward routing of the data packet may be determined from the label for a corresponding received data packet.

In some embodiments, a label may be selected from a first or a second label depending on the discard eligibility associated with the data packet.

In some embodiments the first and second labels are identical except for a single bit, which takes a different value in the first and in the second label to indicate whether or not the data packet is discard eligible. In the exemplary embodiment the first and second labels are identical except for the Most Significant Bit (MSB) of the label. The Most Significant Bit (MSB) is easily parsed from the label to obtain the discard eligible information.

The set of labels from which the selection is made may be considered to be allocated to a single label switched path in a MPLS communication system.

In a third step 60, an outgoing data packet having a header including the label is generated. The generation of an outgoing data packet using a label will be familiar to a skilled person, and therefore will not be discussed in further detail herein.

Figure 4:
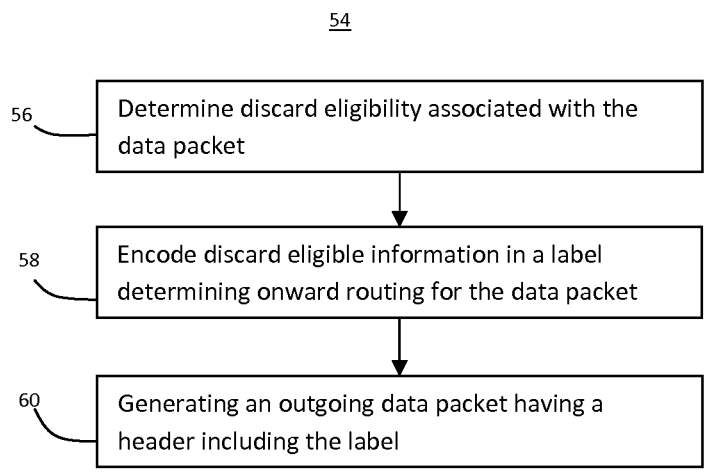
FIG. 4 is a flow chart showing an exemplary method for creating a data packet with discard eligible information in accordance with embodiments of the invention.
Figure 5:
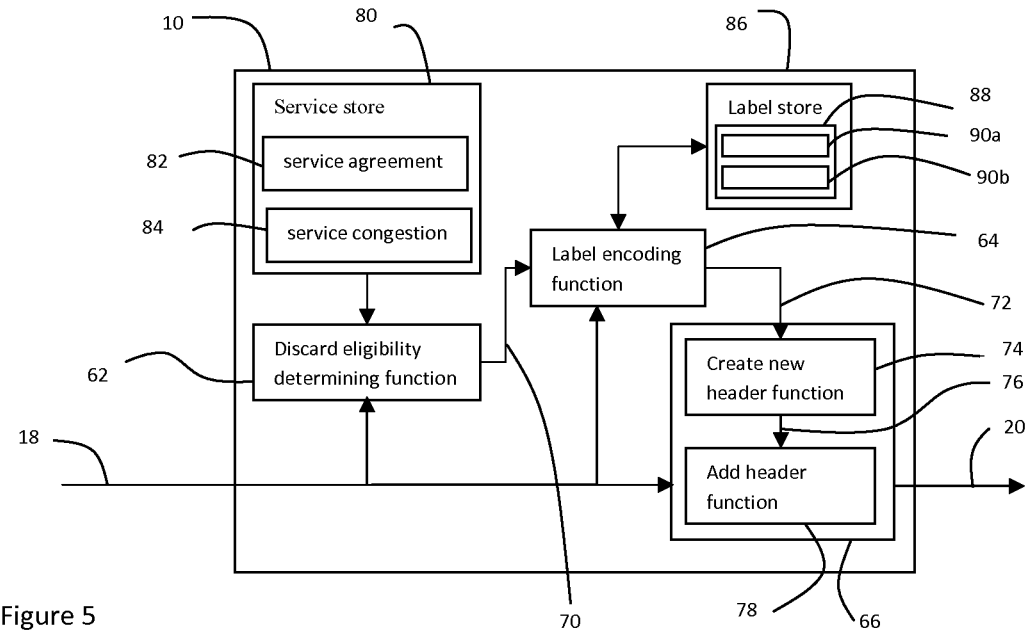
FIG. 5 shows a schematic drawing of an exemplary embodiment of a network node suitable for carrying out the method in accordance with FIG. 4.

FIG. 5 shows a schematic drawing of an exemplary embodiment of a network node suitable for carrying out the method in accordance with FIG. 4. In some embodiments this network node may be used to implement a label edge router (LER) of an MPLS network, such as the Label Edge Router (LER) 10 shown in FIG. 1, and therefore the network node shown in FIG. 5 will be described in the context of the Label Edge Router (LER) 10 shown in FIG. 1.

As described above with reference to FIG. 1, the Label Edge Router (LER) 10 is arranged to receive incoming data 18 from another network 6, and is arranged to forward labelled data 20 to another network node within the MPLS network 4.

The Label Edge Router (LER) 10 is provided with a discard eligibility determining function 62; a label encoding function 64; and data packet generating function 66, which are all coupled to the incoming data 22.

The discard eligibility determining function 62 is operable to determine discard eligibility associated with the data packet, in accordance with step 56 of the exemplary method shown in FIG. 4.

The label encoding function 64 is operable to encode discard eligible information in a label determining onward routing for the data packet, in accordance with step 58 of the exemplary method shown in FIG. 4.

The data packet generating function 66 is operable to generate an outgoing data packet having a header including the label in accordance with step 60 of the exemplary method shown in FIG. 4.

In some embodiments, the incoming data 22 may be stored in a memory in the Label Edge Router (LER) 10 (not shown explicitly in FIG. 5) and the discard eligibility determining function 62, the label encoding function 64, and the data packet generating function 66 access the stored data 22 to obtain the information required to enable the respective function to be performed.

The Label Edge Router (LER) 10 is also provided with service store 80 containing service information. In the exemplary embodiment the service store 80 is part of the Label Edge Router (LER) 10. In other embodiments the service store 80 or part of the service store 80 may be located elsewhere, and the label edge router (LER) 10 may be provided with access to the information therein.

The service store 80 contains service agreement information 82 relating to the level of service to be provided for data transfer, as will be known to a skilled person. This service agreement information may relate to a certain minimum level of bandwidth or a certain maximum latency that packets should experience across the MPLS network 4, for example, or may relate to any other suitable information as will be appreciated by a skilled person.

The service store 80 also contains service congestion information 84, relating to the output transmission rate of a class of traffic on the basis of user-defined criteria, as will be appreciated by a skilled person. The service congestion information 84 may relate to a thresholds rate (for example below a first threshold the data is considered within its profile and marked accordingly, this mark can afterwards be used by the drop eligibility determining function 62).

As will be apparent to a skilled person, the service agreement information 82 and the service congestion information 84 may be stored separately or together in different embodiments.

The discard eligibility determining function 62 is coupled to the service store 80 to access service agreement information 82 relating to the transfer of a data packet and to access service congestion information 84 relating to the data packet transfer.

The discard eligibility determining function 62 is operable to determine discard eligibility 70 associated with the data packet, and is coupled to the label encoding function 64 to provide discard eligibility 70 to the label encoding function 64.

The Label Edge Router (LER) 10 is also provided with a label store 86 in which are stored a plurality of labels for use in headers for data packet to create label switched paths (LSP) for onward transmission of the data packet to the next network node. The labels are allocated to label edge router (LER) 10, for example by a network planning function (not shown), which will be familiar to a skilled person and so will not be explained in more detail.

In embodiments of the invention a set 88 of labels are provided for transmitting data packets in a label switched path to create a label switched tunnel through the MPLS network 4.

In the exemplary embodiment, the set 88 of labels comprises a pair of labels: a first label is a discard eligible label 90a that is to be used as a label for an outgoing data packet that is eligible to be discarded. A second label is a non-discard eligible label 90b that is to be used as a label for an outgoing data packet that is not discard eligible.

The discard eligible label 90a and the non-discard eligible label 90b in the exemplary embodiment are in the format of label 46 shown in the exemplary embodiment shown in FIG. 3 and having discard eligible information 48. Encoding of the discard eligible information (DEI) 48 in the label depends on the discard eligibility 70 associated with the data packet.

In the exemplary embodiment the discard eligible label 90a and non-discard eligible label 90b are identical except for a single bit, which takes a different value in the first and in the second label to indicate whether or not the data packet is discard eligible. In the exemplary embodiment the discard eligible label 90a and non-discard eligible label 90b are identical except for the Most Significant Bit (MSB) of the label. The Most Significant Bit (MSB) is easily parsed from the label to obtain the discard eligible information 48.

The label encoding function 64 is arranged to access the label store 86 to select a label 72 encoding discard eligible information (DEI), as will be explained in more detail below. In some embodiments, encoding of the discard eligible information (DEI) in the label is performed by selecting a label from a set 88 of available labels determining the correct onwards routing of the data packet depending on the discard eligibility 70. In some embodiments the set 88 of available labels determining the onward routing of the data packet may be determined from the label for the corresponding received data packet.

In the exemplary embodiment, a label 72 may be selected from discard eligible label 90a and non-discard eligible label 90b depending on the discard eligibility 70 associated with the data packet.

The label encoding function 64 is also coupled to the data packet generating function 66 to provide label 72 encoding discard eligible information (DEI) 48 (in the exemplary embodiment being either discard eligible label 90a and non-discard eligible label 90b) to the data packet generating function 66.

The data packet generating function 66 is coupled to the label encoding function 64 to receive label 72 encoding discard eligible information (DEI) and is operable to generate a labelled data packet 20 with label 72 for onward transmission, as described above.

In the exemplary embodiment shown in FIG. 5, the data packet generating function 66 has a create new header function 74 that is arranged to receive label 72 from the label encoding function 64 and that is operable to create a header 76 from the received label 72. The data packet generating function 66 is also provided with an add header function 78 arranged to receive the header 76, including label 72 encoding discard eligible information (DEI), from the create new header function 74, as will be explained in more detail in the following description, and operable to create the outgoing data packet 20 labelled with label 72 encoding discard eligible information (DEI) from the header 76 and the data payload.

The division of the functions performed within the Label Edge Router (LER) 10 into the functional modules and the details of the connections between the modules described herein should be understood to be merely illustrative. As will be apparent to a skilled person it is possible to implement the functionality described in many different ways, and all such variations are intended to be encompassed within the scope of the present invention.

In particular, the functions shown within the Label Edge Router (LER) 10 in FIG. 5 may be implemented as functional modules in a computer software program running on a suitable processing device, in which the program flow and/or sub-routine calls may provide the described functionality without explicit couplings between the sub-routines.

During the operation of the Label Edge Router (LER) 10 shown in FIG. 5, the discard eligibility determining function 62 receives the incoming data 18 and determines the discard eligibility 70 associated with the data packet in accordance with step 56 of FIG. 4.

The establishment of discard eligibility 70 in response to receipt of an incoming data packet 18 using the service agreement information and service congestion information can be achieved in many ways as will be known to a skilled person, and therefore will not be described in more detail.

In the exemplary embodiment, the discard eligibility 70 may be:

"red"—meaning the data packet is to be discarded;
"yellow"—meaning that the data packet is discard eligible and may be discarded if the network is congested; or
"green"—meaning that the data packet should be carried by the network without discard.

If the discard eligibility 70 established by the discard eligibility determining function 62 is "red" the packet is discarded and is not output as a labelled packet data 20.

If the discard eligibility 70 established by the discard eligibility determining function 62 is "yellow" or "green", it is output as discard eligibility 70 to the label encoding function 64.

In the exemplary embodiment, the discard eligibility may be passed to the label encoding function 64 as a single bit value, for example a logic value "0" for "green" discard eligibility 70 and a logic value "1" for a "red" discard eligibility 70. This may in some embodiments be achieved by means of a flag that is set or cleared for each data packet according to the determined discard eligibility 70.

The label encoding function 64 uses the discard eligible information 70 provided by the discard eligibility determining function 62 and the address information from the incoming data packet 18 to encode the discard eligibility 70 as discard eligible information 48 in a label determining onward routing for the data packet.

In the exemplary implementation shown in FIG. 5, therefore, in response to "yellow" discard eligibility 70, the label encoding function 64 selects from the set 88 of labels corresponding to the correct routing of the packet, the discard eligible label 90a that is to be used as a label for an outgoing data packet that is discard eligible.

In the exemplary implementation shown in FIG. 5, therefore, in response to a "green" discard eligibility 70, the label encoding function 64 selects from the set 88 of labels corresponding to the correct routing of the packet, the non-discard eligible label 90b that is to be used as a label for an outgoing data packet that is not discard eligible.

In the exemplary embodiment shown in FIG. 5, the label encoding function 64 accesses the label store 86 to obtain the selected label 90a or label 90b, and passes the selected label 90a or label 90b to the data packet generating function 66 as label 72 encoding discard eligible information 48.

In other embodiments (not shown in FIG. 5) the label encoding function 64 may select the required label 90a or label 90b and may inform the data packet generating function 66 of the selected label 90a or label 90b. The data packet generating function 66 may then access the store 86 to obtain the selected label 90a or label 90b. Such variations are a matter of implementation to be determined by a skilled person in different embodiments.

During the operation of the Label Edge Router (LER) 10 shown in FIG. 5, the data packet generating function 66 is arranged to generate a labelled data packet 20 with label 72 for onward transmission, in accordance with step 60 of the exemplary method shown in FIG. 4. Thus in the exemplary embodiment the data packet generating function 66 receives the label 90a or label 90b containing discard eligible information 48 encoding the discard eligibility 70 associated with the data packet and generates an outgoing data packet having a header including the label 90a or label 90b.

As described earlier, in the exemplary embodiment shown in FIG. 5 the data packet generating function 66 is provided with a create new header function 74 and an add header function 78.

Create new header function 74 is arranged to create a header for the onward transmission of the data packet using the label 90a or label 90b encoding the discard eligible information 48. The other information in the header 76 will be generated in accordance with the convention header generation, and will be familiar to a skilled person. As a result, the detailed operation of create new header function 74 will not be described in more detail.

The add header function 78 is arranged to receive the new header 76 generated by create new header function 74 and add it to the payload data of the incoming data packet 18 to form the outgoing data packet 20 for onward transmission within the MPLS network 4. Again the formation of an outgoing data packet using a label is well known to a skilled person and therefore will not be discussed in further detail.

Figure 6:
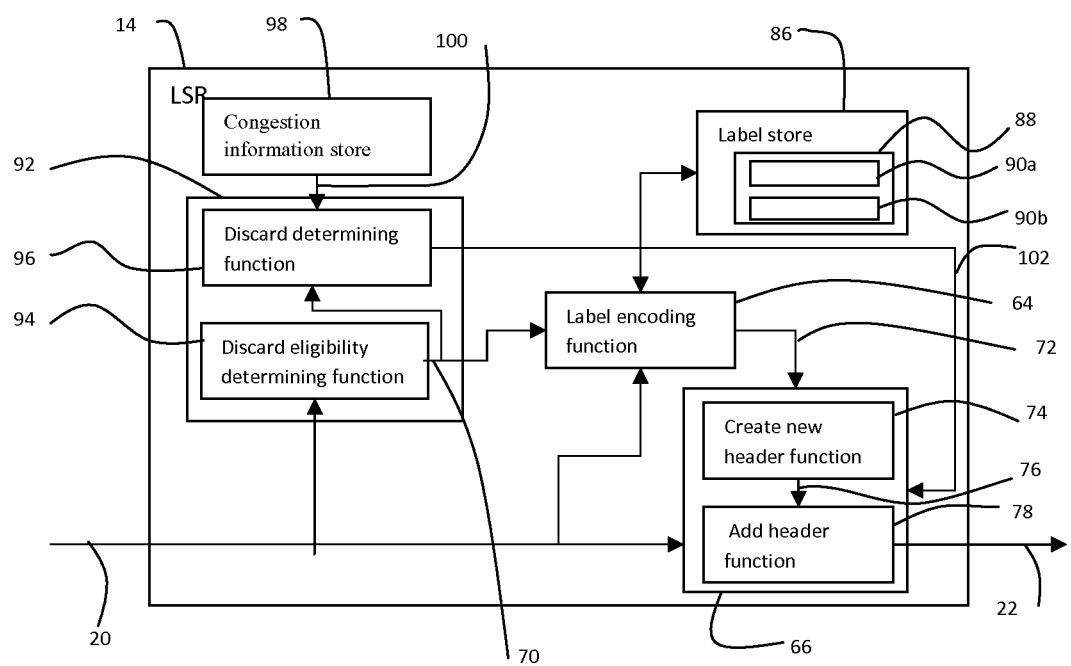
FIG. 6 shows a schematic drawing of an exemplary embodiment of a network node suitable for carrying out the method in accordance with FIG. 4.

FIG. 6 shows a schematic drawing of a further exemplary embodiment of a network node suitable for carrying out the method in accordance with FIG. 4. In some embodiments this network node may be used to implement a label switched router (LSR) of an MPLS network, such as the Label switched Routers (LSR) 14, Label Switched Router (LSR) 16 shown in FIG. 1, and therefore the network node shown in FIG. 6 will be described in the context of the Label switched Router (LSR) 14 shown in FIG. 1.

As described above with reference to FIG. 1, the Label switched Router (LSR) 14 is arranged to receive labelled data 20 from another network node, in this case the Label Edge Router (LER) 10, and is arranged to forward labelled data 22 to another network node within the MPLS network 4, in this case the Label switched Router (LSR) 16.

In FIG. 6, elements having the same function as corresponding elements in FIG. 5 have been given the same reference numerals.

The Label switched Router (LSR) 14 is provided with a discard eligibility monitoring function 92; a label encoding function 64; and data packet generating function 66, which are all coupled to the labelled data packet 16. In some embodiments, the received labelled data packet 20 may be stored in a memory in the Label switched Router (LSR) 14 (not shown explicitly in FIG. 6) and the discard eligibility monitoring function 92, the label encoding function 64, and the data packet generating function 66 may access the stored labelled data packet 16 to obtain the information required to enable the respective function to be performed.

The discard eligibility monitoring function 92 has a discard eligibility determining function 94 and a discard determining function 96.

The discard eligibility determining function 94 is coupled to the received labelled data packet 20 and determines the discard eligibility 70 associated with the received labelled data packet 20 in accordance with step 56 of the method shown in FIG. 4. In some embodiments, this may be achieved by examination of the label of the header of the data packet 16 to determine the discard eligible information 48 encoded therein. In the exemplary embodiment, the most significant bit (MSB) of the label is used to convey the discard eligible information 48.

The discard eligibility determining function 94 is coupled to the label encoding function 64 to provide discard eligibility 70 to the label encoding function 64 once the discard eligibility monitoring function 92 has determined the discard eligibility 70 associated with the received labelled data packet 20.

The label encoding function 64 is coupled to the data packet generating function 66 to provide a label 72 encoding discard eligible information 48 to the data packet generating function 66. The label may be label 90a or label 90b, depending upon the selection of the label encoding function 64.

The data packet generating function 66 is arranged to generate, from the label 90a or label 90b, a labelled data packet 22 for onward transmission in accordance with step 60 of the exemplary method shown in FIG. 4.

The operation of the label encoding function 64 and the data packet generating function 66 are substantially as described above with reference to FIG. 5 as will be appreciated by a skilled person, and will not therefore be repeated.

In some embodiments, label store is provisioned with a set 88 of labels and with a label mapping for a label switched path that provides for the selection of the discard eligible label 90a in response to receipt of an incoming label A and that provides for the selection of the non-discard eligible label 90b in response to the receipt of incoming label B. In this case the label encoding function 64 is not required to have knowledge of the discard eligibility 70 in order to determine a label for onwards transmission of the data packet, but instead label mapping rules can ensure the correct transmission of the data packet along a discard eligible label switched path tunnel (LSP tunnel) or along a non-discard eligible label switched path tunnel (LSP tunnel).

As described above the discard eligibility monitoring function 92 is also provided with a discard determining function 96 that is coupled to the discard eligibility determining function 94 to receive the discard eligible information 70 determined for the data packet.

If the discard eligible information 70 indicates that the data packet 20 is not discard eligible, then no action is required from the discard determining function 96. The data packet may simply be routed onwards within the MPLS network 4 as normal.

However, if the discard eligible information 70 indicates that the data packet 20 is discard eligible, the discard determining function 96 must determine whether the data packet is to be discarded or is to be routed onwards within the MPLS network 4.

Thus, the discard determining function 96 is coupled to the discard eligibility determining function 94 to receive at least discard eligible information 70 indicating that the data packet is discard eligible. The discard determining function 96 is also coupled to a congestion information store 98 to receive congestion information 100 relating to the packet congestion experienced in the network. The discard determining function 96 uses the information 100 and discard eligible information 70 indicating that the data packet is discard eligible in order to determine whether or not to discard the data packet, or whether to forward to data packet onwards through the MPLS network 4.

In some embodiments, the discard determining function 96 is coupled to the data packet generating function 66 to provide a packet discard instruction 102 when a discard determination is made by the discard determining function 96.

Figure 7:
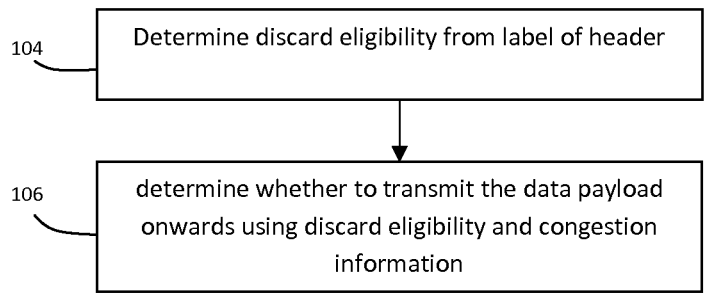
FIG. 7 is a flow chart showing an exemplary method for receiving a data packet with discard eligible information in accordance with embodiments of the invention.

An exemplary method of operation in accordance with some embodiments will now be described in more detail with reference to FIG. 7.

In a first step 104 of the method, the discard eligible information 70 is determined from a label of a header. In the exemplary apparatus shown in FIG. 6, this step is carried out by the discard eligibility determining function 94.

In a second step 106 of the method, it is determined whether to transmit the data payload onwards using discard eligibility indicator 70 and congestion information 100. In the exemplary apparatus shown in FIG. 6, this step is carried out by the discard determining function 96.

In some embodiments, if the congestion information 100 indicates that the MPLS network 4 is too congested, the discard determining function 96 may determine that the data packet should be discarded and should not be forwarded in the MPLS network 4. Thus in the exemplary embodiment shown with respect to FIG. 6, the discard determining function 96 is coupled to the data packet generating function 66 to provide the data packet generating function 66 with a packet discard instruction 102. Clearly the discard determining function may be implemented in other ways as will be apparent to a skilled person.

The division of the functions performed within the Label switched Router (LSR) 14 into the functional modules and the details of the connections between the modules described herein should be understood to be merely illustrative. As will be apparent to a skilled person it is possible to implement the functionality described in many different ways, and all such variations are intended to be encompassed within the scope of the present invention.

In particular, the functions shown within the Label switched Router (LSR) 14 in FIG. 6 may be implemented as functional modules in a computer software program running on a suitable processing device, in which the program flow and/or sub-routine calls may provide the described functionality without explicit couplings between the sub-routines.

It can be seen from the above description, in embodiments of the invention the discard eligibility for a data packet is encoded as discard eligible information in the label determining onward routing for the data packet. In this way, in the exemplary embodiment, eight classes of service (CoS) are made available by the 3 bits of the TC(EXP) field and discard eligibility for each packet can be indicated separately by encoding the discard eligible information in the label.

When the present invention is implemented in a MPLS network, each packet carried on a label switched path LSP is able to carry one class of service indication selected from eight possible class of service indications, in addition to the discard eligible indicator, so that a total of 16 class of service (CoS)+Discard Eligible Information (DEI) combinations are made available.

The use of different labels, each encoded with a different label depending on the discard eligibility indication associated with that packet, does not result in erroneous routing of the data packets by network nodes that do not recognise the encoding of the discard eligible information 48 in the label. Such network nodes merely consider data packets with the discard eligible label 90a as belonging to a different label switched path. However, the correct routings may still be ensured by ensuring suitable label allocations to and mappings within the network nodes. As a result equipment in which embodiments of the invention are implemented is backwardly compatible with legacy equipment. In such cases, the discard eligibility or discard eligible information may be transmitted using signalling protocol extensions.

In the described embodiments it is required to transmit only two states of the discard eligibility 70, "green" meaning not eligible for discard or "yellow" meaning eligible for discard, and these states are encoded as discard eligible information 48 in a single bit. However in some embodiments it may be required to transmit more than two states of discard eligibility and in this case these states are encoded as discard eligible information 48 in more than one bit.

Some embodiments therefore provide a way of increasing the number of classes of service that can be carried on a single label switched path improved inter-working between connected networks. In this way there is no need to compromise between discard eligible information and number of classes of service when data passes between other data networks and an MPLS network.

In some embodiments, better operation and usability of a hybrid network is possible. One example of this is when providing Ethernet connectivity for metro Ethernet framework (MEF) services, ensuring proper end-to-end quality of service (QoS) and service level agreement (SLA) guarantees.

In some embodiments a MPLS network is able to support a wider range of differentiated services, thus allowing the Service Provider and the Network Operator to increase their revenues and their potential for higher margins.

Embodiments may provide one or more of the following:
support of a higher range of classes of service by MPLS technology without requiring multiple Label-Only-Inferred-PSC LSP (L-LSP), thus enabling easier interworking with Provider Bridged Network (PBN)/Provider Backbone Bridged Network (PBBN);
backward compatibility with legacy equipment and networks, including the possibility of the discard eligible information DEI being delivered throughout both Management Plane based networks and Control Plane based networks, with extensions to the signaling protocols, despite the presence of legacy nodes;
in embodiments such as the exemplary embodiment where the most significant bit MSB of the label is used for discard eligible information, the functionality of the label switched path (LSP)/pseudowire (PW) is not compromised, because the most significant bit (MSB) is still available for label parsing.

In the specification the term software or software program is intended to also be applicable to a software program fragment as well as to a complete software program and is intended to mean any set of instructions capable of being followed by a processor.

Modifications and other embodiments of the disclosed invention will come to mind to one skilled in the art having the benefit of the teachings presented in the foregoing description and the associated drawings. Therefore it is to be understood that the invention is not to be limited to specific embodiments disclosed and that modifications and other embodiments are intended to be included within the scope of this disclosure. Although specific terms may be employed herein, they are used in a generic and descriptive sense only and not for the purposes of limitation.

The invention claimed is:

1. A method executed by a router for creating a data packet, containing a data payload and a label determining onward routing for the data packet, for onward transmission in a data communication system, comprising the steps of:
   determining discard eligibility, associated with the data packet;
   selecting the label from a first label and a second label depending on the discard eligibility associated with the data packet, wherein the first label and the second label are stored in a label store of the router, wherein the first label and the second label are allocated to a single label switched path in the data communication system, wherein the first label is a discard eligible label and the second label is a discard ineligible label; and
   generating and transmitting an outgoing data packet including the label.

2. The method as claimed in claim 1, wherein the first and the second labels are identical except for a single bit, which takes a different value in the first and in the second label.

3. The method as claimed in claim 2 wherein the first and the second labels are identical except for the Most Significant Bit (MSB) of the label.

4. The method as claimed in claim 1 wherein the data communication system is a multi-protocol label switching (MPLS) communication system.

5. The method as claimed in claim 1 wherein the step of determining discard eligibility associated with the data packet comprises the step of determining discard eligible information from a received label of a received data packet.

6. The method as claimed in claim 1 further comprising a step of determining whether to transmit the data payload onwards using the discard eligibility associated with the data packet and congestion information relating to traffic in the data communication system.

7. The method as claimed in claim 1 wherein the step of determining discard eligibility associated with the data packet comprises using service agreement information relating to a transfer of the data packet over the data communication system to determine the discard eligibility associated with the data packet.

8. The method of claim 1, further comprising:
   receiving a second data packet, wherein the second data packet includes a received data payload and a received label controlling routing of the second data packet in the data communication system;
   determining discard eligibility from the received label; and
   determining whether to transmit the received data payload onwards using the discard eligibility determined from the received label and network congestion information.

9. A non-transitory machine-readable storage medium comprising instructions, which when executed by a processor of a router, causes the router to perform operations for creating a data packet, containing a data payload and a label determining onward routing for the data packet, for onward transmission in a data communication system, the operations comprising:
   determining discard eligibility, associated with the data packet;
   selecting the label from a first label and a second label depending on the discard eligibility associated with the data packet, wherein the first label and the second label are stored in a label store of the router, wherein the first label and the second label are allocated to a single label switched path in the data communication system, wherein the first label is a discard eligible label and the second label is a discard ineligible label; and
   generating and transmitting an outgoing data packet including the label.

10. The non-transitory machine-readable storage medium of claim 9, wherein the instructions, which when executed by the processor of the router, cause the router to perform further operations comprising:
    receiving a second data packet, wherein the second data packet includes a received data payload and a received label controlling routing of the second data packet in the data communication system;
    determining discard eligibility from the received label; and
    determining whether to transmit the received data payload onwards using the discard eligibility determined from the received label and network congestion information.

11. A device for creating a data packet, containing a data payload and a label determining onward routing for the data packet, for onward transmission in a data communication system, comprising:

a label store for storing a set of labels including at least a first label and a second label, wherein the first label and the second label are allocated to a single label switched path in the data communication system, wherein the first label is a discard eligible label and the second label is a discard ineligible label; and a processor to execute a discard eligibility determining module, a label encoding module, and a data packet generating module, the discard eligibility determining module, when executed by the processor, is to determine discard eligibility associated with the data packet, the label encoding module, when executed by the processor, is to select the label from the first label and the second label, depending on the discard eligibility associated with the data packet, and the data packet generating module, when executed by the processor is to generate and transmit an outgoing data packet including the label.

12. The device of claim 11, the device to receive a second data packet including a received data payload and a received label controlling routing of the second data packet in the data communication system, the device further comprising:

a network congestion information store storing network congestion information, wherein the discard eligibility determining module, when executed by the processor, is to determine a discard eligibility associated with the second data packet from the received label controlling routing of the data packet in the data communication system, and wherein the processor is operable to execute a discard determining module, wherein the discard determining module, when executed by the processor, is to obtain the discard eligibility associated with the second data packet and the network congestion information and determine whether to transmit the received data payload onwards depending on the discard eligibility associated with the second data packet and the network congestion information.

* * * * *